(12) United States Patent
Su et al.

(10) Patent No.: US 7,602,605 B2
(45) Date of Patent: Oct. 13, 2009

(54) CASE FOR AN INFORMATION HANDLING SYSTEM

(75) Inventors: Chih Min Su, Taipei (TW); Chien Chou Pan, Tao-Yuan (TW); Chien Hua Pan, Tao-Yuan (TW); Yu-Lin Chen, Jhongjheng (TW)

(73) Assignee: Dell Products L.P., Round Rock, TX (US)

( * ) Notice: Subject to any disclaimer, the term of this patent is extended or adjusted under 35 U.S.C. 154(b) by 11 days.

(21) Appl. No.: 11/871,367

(22) Filed: Oct. 12, 2007

(65) Prior Publication Data
US 2009/0097210 A1 Apr. 16, 2009

(51) Int. Cl.
*G06F 1/16* (2006.01)

(52) U.S. Cl. .............................. 361/679.57; 312/223.3; 235/475; 292/252; 109/67

(58) Field of Classification Search ... 312/223.1–223.5; 235/475; 292/152, 252, 303; 109/67; 361/679–687, 361/724–727
See application file for complete search history.

(56) References Cited

U.S. PATENT DOCUMENTS

| | | | | |
|---|---|---|---|---|
| 7,298,615 | B2* | 11/2007 | Wong | 361/687 |
| 7,428,835 | B2* | 9/2008 | Fan et al. | 70/358 |
| 2004/0201957 | A1* | 10/2004 | Wu et al. | 361/687 |

* cited by examiner

*Primary Examiner*—Hung V Duong
(74) *Attorney, Agent, or Firm*—Baker Botts L.L.P.

(57) ABSTRACT

A case for an information handling system, the case comprising a front bezel, a side panel, a lock mounted in the front bezel and operable to restrict removal of the front bezel from the case, a latch mounted within the case operable to restrict removal of the side panel from the case, and a link connecting the lock and the latch such that operation of the lock to restrict removal of the front bezel from the case also restricts removal of the side panel from the case.

17 Claims, 4 Drawing Sheets

CASE FOR AN INFORMATION HANDLING SYSTEM

TECHNICAL FIELD

The present invention is related to information handling systems and, more particularly, cases for information handling systems.

BACKGROUND OF THE INVENTION

As the value and use of information continues to increase, individuals and businesses seek additional ways to process and store information. One option for processing and storing information is an information handling system. An information handling system generally processes, compiles, stores, and/or communicates information or data for business, personal, educational, governmental, or other purposes thereby allowing users to take advantage of the value of the information.

Because technology and information handling needs and requirements vary between different users and/or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may include cases, chassis, and/or housings, depending on the category of system and/or the anticipated operating environment and/or usage. For example, personal computers may include desktop, tower, and/or portable computers. Server systems may include individual blades, server blocks, and/or other components. In any particular information handling system, the choice of housing or a case may depend on several features of the housing (e.g., visual appeal, size, available ports and/or connectors, etc.). One feature that may drive selection of an information handling system is security. For example, in uses demanding confidential information or in locations without restricted access, a user may require an information handling system that can withstand deliberate attempts to extract information and/or components. Some information handling system security features offered include password protection and/or locks.

Locks may be installed on the housing or case for any sort of information handling system. For example, a housing for personal computers may include a front panel, often referred to as a front bezel. In some housings, screws, tabs, and/or other components may be used to retain the front bezel and/or any other panels making up the housing. In other housings, a keyed lock may restrict operation of the information handling system and/or removal of the front bezel from the housing.

FIG. 1 depicts selected elements of an example prior art information handling system 1. Information handling system 1 includes a case 10. Information handling system 1 may include processing resources, e.g., one or more central processing units (CPUs) and storage resources that are accessible to the processing resources. Storage resources may include volatile storage or memory and/or persistent storage, e.g., disk storage, flash memory or other type of erasable read only memory (ROM), and the like. Information handling system 1 may also include various other peripheral or I/O devices known in the field of data processing system design.

Case 10 may include any housing, chassis, or other enclosure appropriate for packaging, protecting, and/or housing electrical and/or mechanical components of information handling system 1. For instance, case 10 may include sheet metal, formed plastic, wood, and/or any other material. Case 10, as shown in FIG. 1, may include a front bezel 12, a side panel 14, a lock 16, and one or more faceplates 18.

Front bezel 12 may include any component and/or device configured to house components of information handling system 1 and/or allow appropriate access to components (e.g., power switches, disk drives, expansion bays, etc.). Front bezel 12 may be integral with one or more additional portions of case 10 or may be removable as a separate piece. In the embodiment shown in FIG. 1, front bezel 12 may be removed from case 10. In addition, front bezel 12 may include removable faceplates 18.

Side panel 14 may include any component and/or device configured to house components of information handling system 1 and/or allow appropriate access to components. In the embodiment shown in FIG. 1, side panel 14 is made from a single piece of sheet metal that includes two side panels 14 and a top panel. In such embodiments, removal of side panel 14 may result in exposure of the internal components of information handling system 1.

Lock 16 may include any component and/or device configured to restrict access to components of information handling system 1. For example, operation of lock 16 may disable one or more electronic components of information handling system 1 (e.g., a hard drive, a power supply, etc.). As another example, lock 16 may restrict removal of front bezel 12. Lock 16, as shown in FIG. 1, may be operated by a key.

Faceplates 18 may include any removable panel or other covering. Removal of one faceplate 18 may reveal an expansion bay, connector, switch, and/or any other components of information handling system 1. For example, removal of faceplate 18 may allow installation of a floppy disk drive, CD-ROM drive, and/or another peripheral device.

SUMMARY OF THE INVENTION

The present disclosure describes a housing for an information handling system. Although the following discussion focuses on housings in the context of personal computers, these teachings may be used in a variety of applications related to housings in information handling systems.

In one embodiment, the present disclosure provides a case for an information handling system. The case may include a front bezel, a side panel, a lock mounted in the front bezel, a latch mounted within the case, and a link connecting the lock and the latch. The lock may be operable to restrict removal of the front bezel from the case. The latch may be operable to restrict removal of the side panel from the case. Operation of the lock to restrict removal of the front bezel from the case may also restrict removal of the side panel from the case.

In another embodiment, the present disclosure provides a mechanism for a case housing an information handling system. The case may include a front bezel and a side panel. The mechanism may comprise a lock mounted in the front bezel, a latch mounted within the case, and a link connecting the lock and the latch. The lock may be operable to restrict removal of the front bezel from the case. The latch may be operable to restrict removal of the side panel from the case.

The link may be configured such that operation of the lock to restrict removal of the front bezel from the case also restricts removal of the side panel from the case.

In another embodiment, the present disclosure provides an information handling system. The information handling system may include a case for an information handling system. The case may include a front bezel, a side panel, a lock mounted in the front bezel, a latch mounted within the case, and a link connecting the lock and the latch. The lock may be operable to restrict removal of the front bezel from the case. The latch may be operable to restrict removal of the side panel from the case. Operation of the lock to restrict removal of the front bezel from the case may also restrict removal of the side panel from the case.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Preferred embodiments of the invention and its advantages are best understood by reference to FIGS. 2-5 wherein like numbers refer to like and corresponding parts.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For the purposes of this disclosure, computer-readable media may include any instrumentality, or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

The exemplary implementations of information handling systems presented herein may emphasize the context of desktop personal computers; it should be understood, however, that the features described herein may also be appropriate for other classes of information handling systems including, as examples, mobile systems including notebook or lap top systems and hand held systems.

Figure 1:
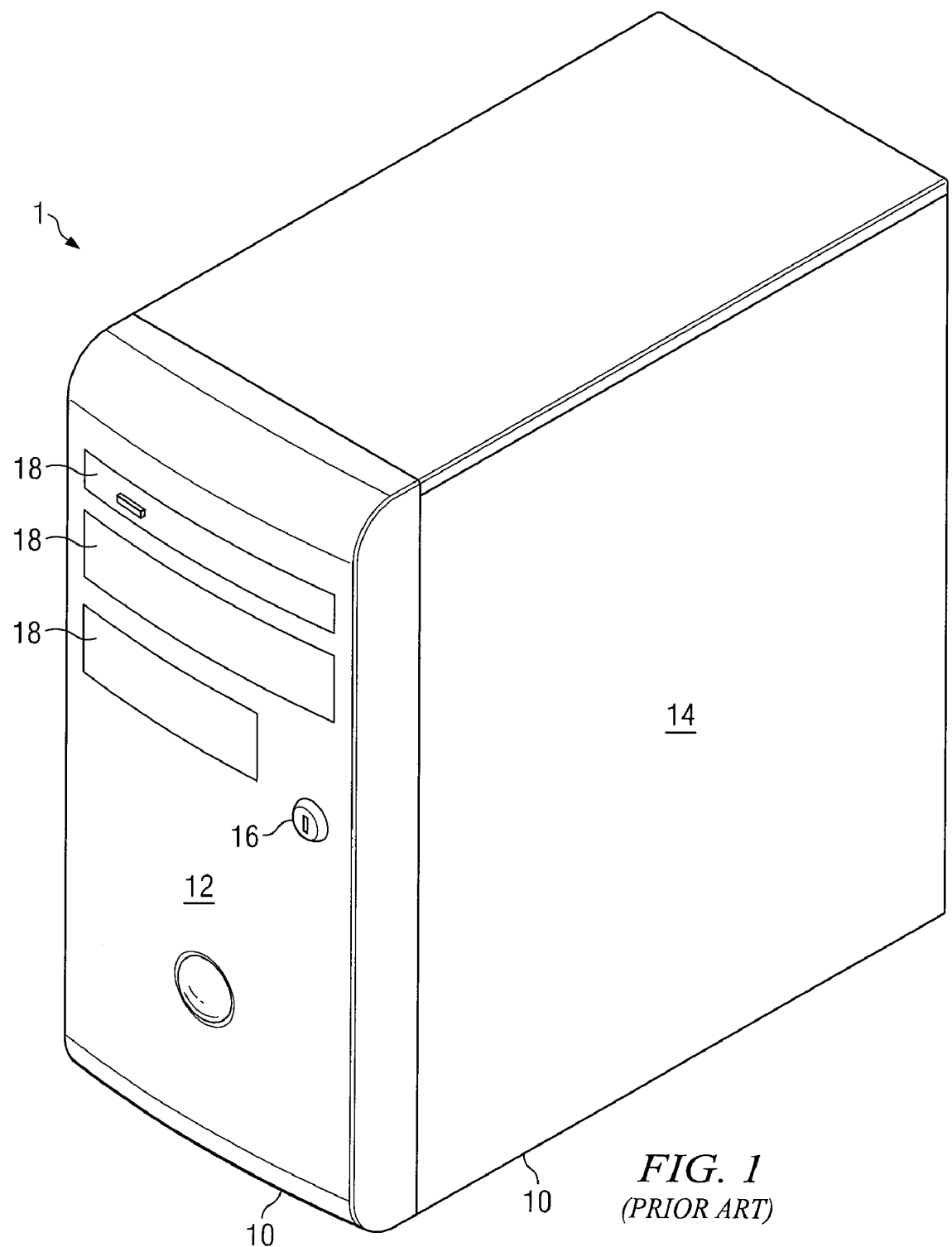
FIG. 1 depicts selected elements of a prior art information handling system.
Figure 2:
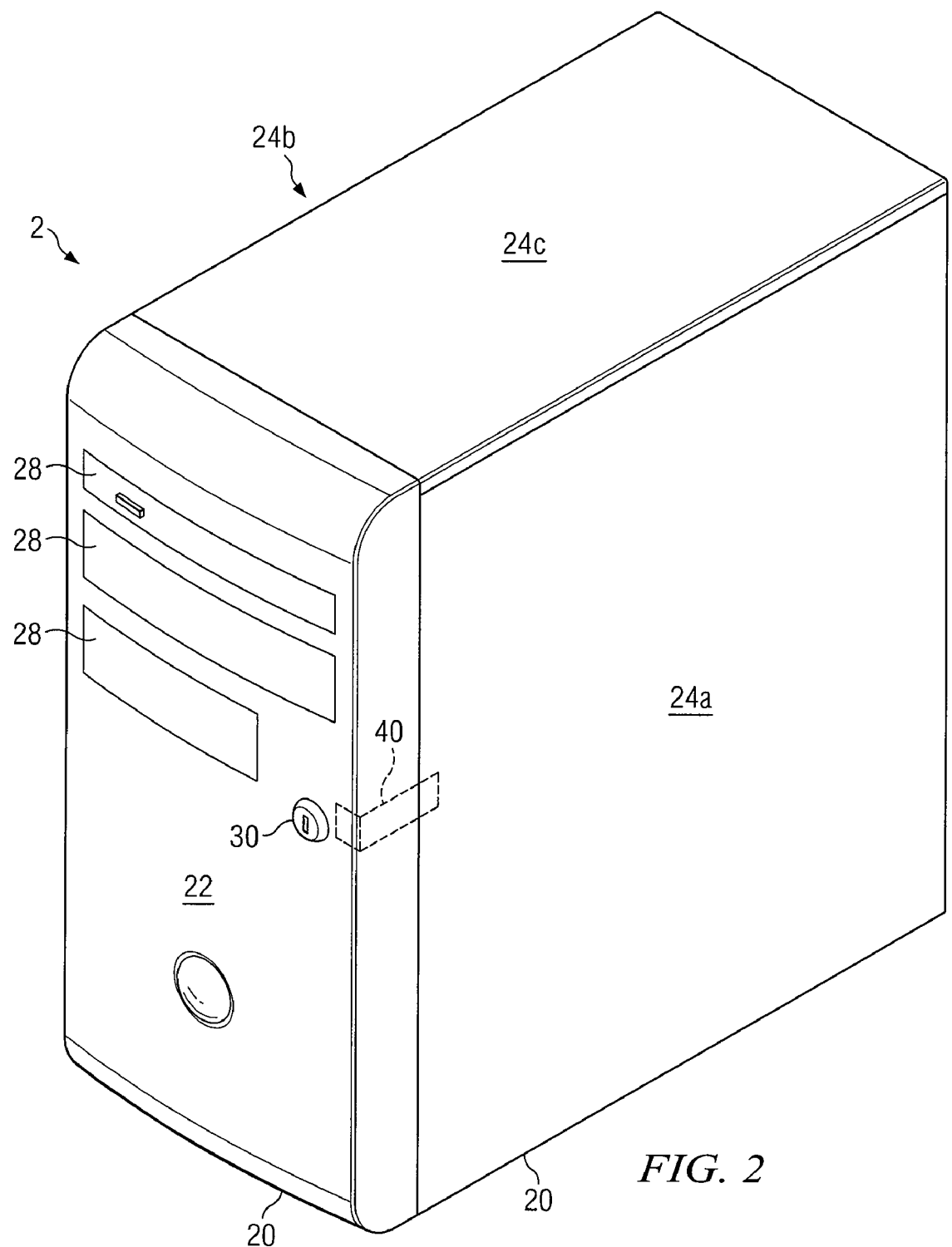
FIG. 2 depicts selected elements of an embodiment of an information handling system incorporating teachings of the present disclosure.

FIG. 2 depicts selected elements of an embodiment of an information handling system 2 incorporating teachings of the present disclosure. Information handling system 2 may include a case 20 and various processing resources, e.g., one or more central processing units (CPUs) and storage resources that are accessible to the processing resources. Such resources may be located on or in association with circuit boards (e.g., a motherboard). Storage resources may include volatile storage or memory and/or persistent storage, e.g., disk storage, flash memory or other type of erasable read only memory (ROM), and the like. Information handling system 2 may also include various other peripheral or I/O devices known in the field of data processing system design.

Case 20 may include any housing, chassis, or other enclosure appropriate for packaging, protecting, and/or housing electrical and/or mechanical components of information handling system 2. For instance, case 20 may include sheet metal, formed plastic, wood, and/or any other material. Case 20, as shown in FIG. 2, may include a front bezel 22, a side panel 24, one or more faceplates 28, a lock 30, and a latch 40.

As an example, personal computer motherboards may be produced in a variety of shapes and sizes. Some standard shapes and sizes may be designated by a commonly known form factor. It is common, for example, to refer to early IBM personal computer motherboards as having a "PC/XT" form factor. It is also common for IBM-compatible computer motherboards to fit various standardized case form factors. Some examples of commonly used form factors are AT, ATX, EATX, ETX, microATX, FlexATX, LPX, NLX, BTX, Mini-ITX, and WTX. In some embodiments, case 20 may be described by reference to a standardized form factor.

Front bezel 22 may include any component and/or device configured to house components of information handling system 2 and/or allow appropriate access to components (e.g., power switches, disk drives, expansion bays, etc.). Front bezel 22 may be integral with one or more additional portions of case 20 or may be removable as a separate piece. In the embodiment shown in FIG. 2, front bezel 22 may be removed from case 20. In addition, front bezel 22 may include removable faceplates 28.

Side panel 24 may include any component and/or device configured to house components of information handling system 2 and/or allow appropriate access to components. Side panel 24 may form or define any one or more sides of case 20, including any lateral side, top, bottom, or rear sides of case 20. In the embodiment shown in FIG. 2, side panel 24 is an integral or fastened piece of sheet metal that defines two lateral side portions 24a and 24b, and a top portion 24c of case 20. In such embodiments, removal of side panel 24 may result in exposure of the internal components of information handling system 2.

Faceplates 28 may include any removable panel or other covering. Removal of one faceplate 28 may reveal an expansion bay, connector, switch, and/or any other components of information handling system 2. For example, removal of faceplate 28 may allow installation of a floppy disk drive, CD-ROM drive, and/or another peripheral device.

Lock 30 may include any component and/or device configured to restrict access to components of information handling system 2. For example, operation of lock 30 may disable one or more electronic components of information handling system 2 (e.g., a hard drive, a power supply, etc.). As another example, lock 30 may restrict removal of front bezel 22. Lock 30, as shown in FIG. 2, may be operated by a key. In other embodiments, lock 30 may include a combination lock and/or any other means of selectively allowing access.

Latch 40 may include any system, component, and/or device configured to restrict removal of side panel 24. As in the embodiment depicted in FIG. 2, side panel 24 may be integral with one or more other panels or portions of case 20, such that restricting removal of side panel 24 also restricts removal of one or more additional panels of case 20. For example, latch 40 may include a mechanical linkage between front bezel 22 and side panel 24.

The implementation of information handling system 2 as described above is merely exemplary, particularly with regard to the description of specific types of information handling systems and specific types of cases. Other information handling systems and cases may be used in lieu of those described herein.

Figure 3:
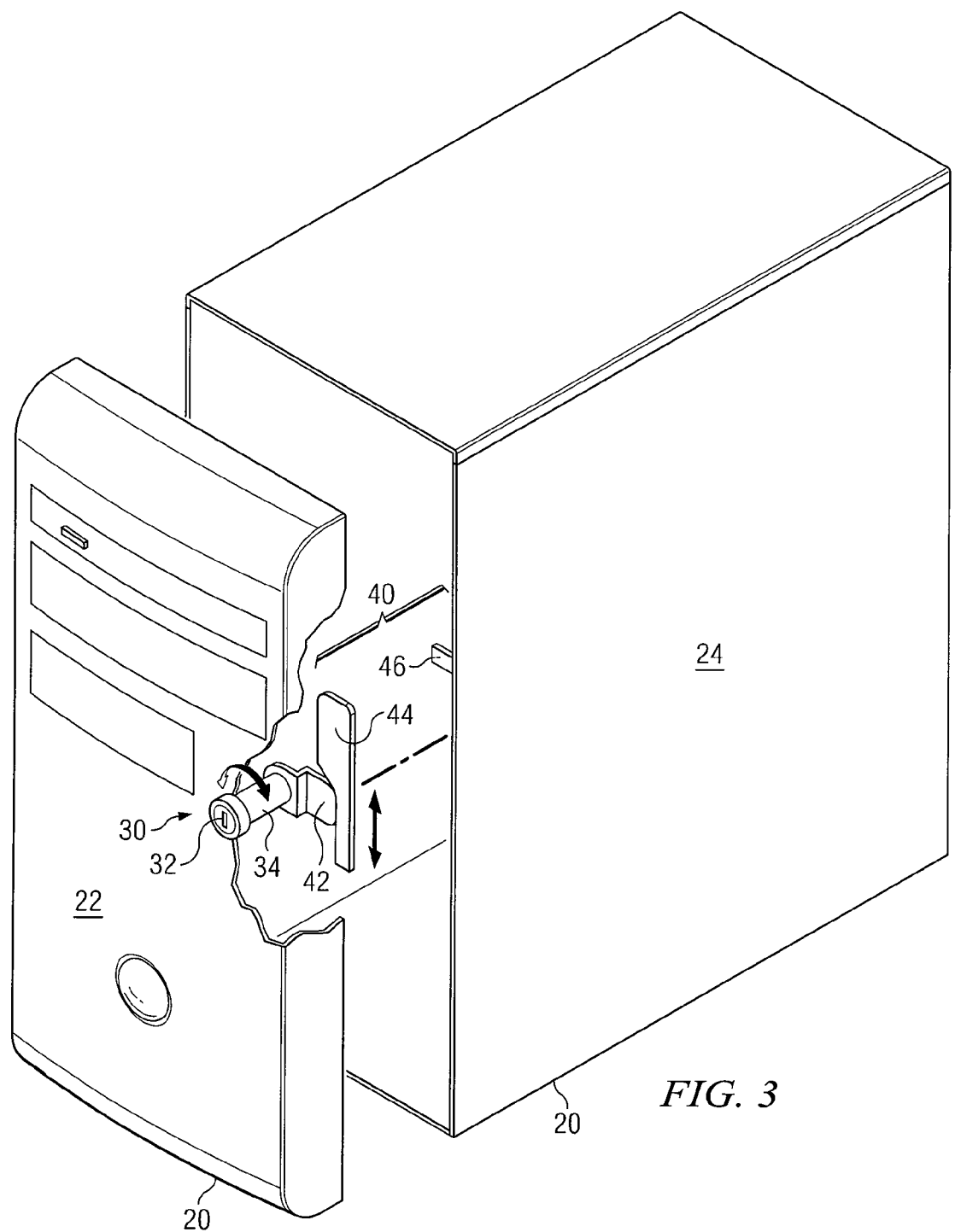
FIG. 3 depicts the information handling system of FIG. 2 with portions broken away.

FIG. 3 depicts the information handling system of FIG. 2 with portions broken away. As shown in FIG. 3, lock 30 may include a keyhole 32 and a cylinder 34. Latch 40 may include a link 42, a slider 44, and a bar 46. Lock 30 and latch 40 may be configured to interact so that operation of lock 30 to restrict removal of front bezel 22 also restricts removal of side panel 24. Lock 30, latch 40, and any components included in those parts may be formed of any material and/or configuration compatible with case 20, the electronics components of information handling system 2, etc. Material selection and manufacturing considerations may include, for example, static electricity, conductivity, weight, size, and/or shape.

Keyhole 32 may include any aperture, device, and/or component configured to allow selective operation of lock 30. For instance, keyhole 32 may be shaped to allow only certain keys to operate lock 30 (e.g., tubular keys). Cylinder 34 may include any component and/or housing configured to house components of lock 30. In some embodiments, cylinder 34 may include a hollow cylindrical sleeve.

Latch 40 may be configured to interact with lock 30. For example, operation of lock 30 may result in the operation of link 42. In such embodiments, link 42 may be any device or component configured to translate the motion of lock 30 to latch 40.

For example, link 42 may include one or more bars configured to provide a mechanical link between lock 30 and latch 40. In some embodiments, link 42 may be rotatably mounted to cylinder 34 and/or any other suitable component of lock 30. Link 42 may be configured to translate the rotational movement of lock 30 (e.g., as caused by operation of a key in keyhole 32) into the reciprocating or translational movement of slider 44. In embodiments including link 42, link 42 may be made of any suitable material (e.g., stamped sheet metal, rigid plastic, etc.).

In another example, as shown in the embodiment depicted in FIG. 3, link 42 may include a cam. Link 42 may be any projecting member suitable for use with latch 40 (e.g., a tooth, an eccentric disk, etc.).

Slider 44 may be configured to produce reciprocating or translational movement as a result of the operation of lock 30. For example, as shown in FIG. 3, slider 44 may operate as a follower in relation to link 42. In other embodiments, slider 44 may be connected to link 42 to form a sliding linkage. Slider 44 may be mounted in an appropriate slot, groove, retainers, and/or any other component or device configured to allow reciprocating movement without lateral translation. In some embodiments, slider 44 may be coupled to or restrained in front bezel 22 so that slider 44 will remain coupled to or restrained in front bezel 22 when side panel 24 is removed from case 20.

Bar 46 may include any device or component configured to interact with slider 44 to restrict removal of side panel 24 from case 20. For example, bar 46 may include a projection from side panel 24, and/or a separate bar attached to side panel 24. In another embodiment, bar 46 may include a feature of side panel 24 configured to mate with slider 44 (e.g., a slot into which slider 44 may extend). The selection and design of bar 46 may depend on mechanical strength to avoid bending or other forcible removal of side panel 24 without operation of lock 30.

Embodiments such as that shown in FIGS. 2 and 3 may provide a single lock operable to restrict removal of both front bezel 22 and side panel 24. Such a lock may provide a more secure case 20 for information handling system 2 by restricting physical access to components within case 20 as well as disabling operation of electronic components. Case 20 may provide increased security for data stored in information handling system 2.

Figure 4:
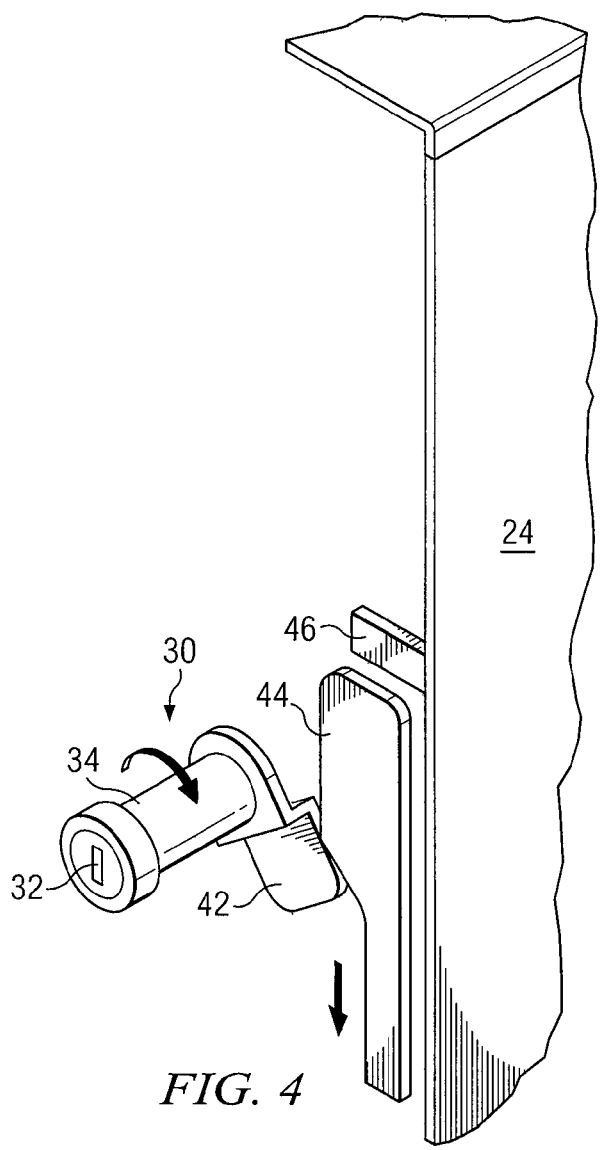
FIGS. 4 and 5 depict selected elements of an example information handling system in operation, according to an embodiment of the present disclosure.
Figure 5:
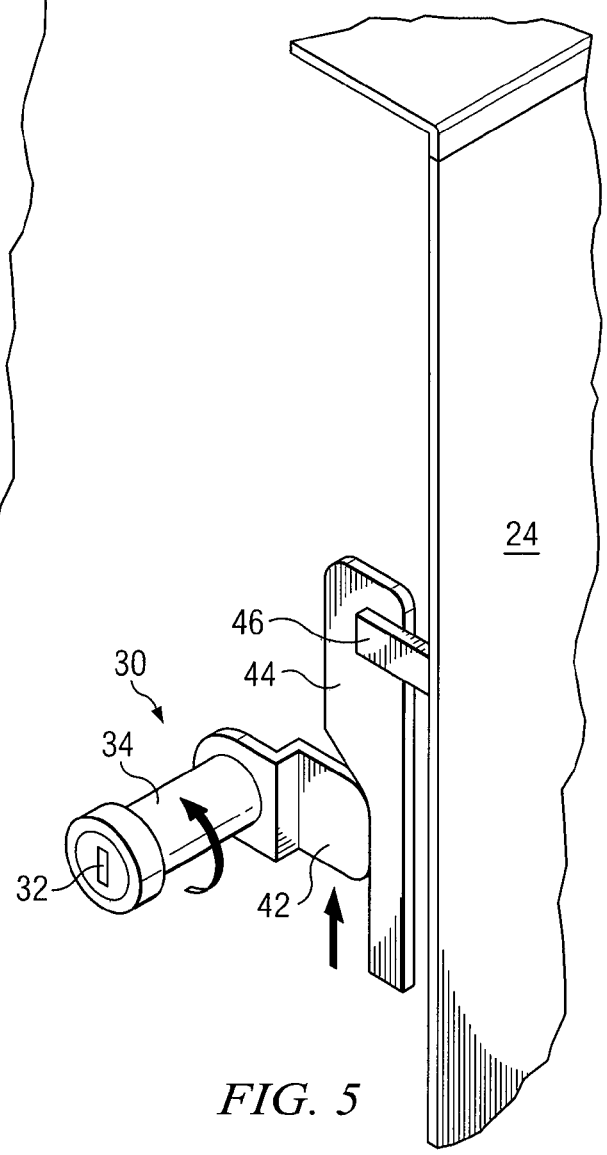

FIGS. 4 and 5 depict selected elements of an embodiment of an information handling system in operation. FIG. 4 depicts latch 40 in a first, open position. FIG. 5 depicts latch 40 in a second, closed position. The open and closed positions correspond to the open and closed positions of lock 30, respectively. While lock 30 and latch 40 are in the open position, front bezel 22 may be removed from case 20 and side panel 24 may be disengaged from front bezel 22 and/or case 20. While lock 30 and latch 40 are in the closed position, front bezel may not be removed from case 20 and side panel 24 may not be disengaged from front bezel 22 and/or case 20 because slider 44 and bar 46 provide a hard stop.

Although the disclosed embodiments have been described in detail, it should be understood that various changes, substitutions and alterations can be made to the embodiments without departing from their spirit and scope.

What is claimed is:

1. A case for an information handling system, the case comprising:
    a front bezel;
    a side panel;
    a lock mounted in the front bezel, the lock operable to restrict removal of the front bezel from the case;
    a latch mounted within the case operable to restrict removal of the side panel from the case; and
    a link connecting the lock and the latch, such that operation of the lock to restrict removal of the front bezel from the case also restricts removal of the side panel from the case;
    wherein the lock has a locked position such that when the lock is in the locked position, the lock is configured to disable operation of one or more electronic components of the information handling system.

2. A case according to claim 1, wherein the case has an ATX form factor.

3. A case according to claim 1, wherein the case has a micro-ATX form factor.

4. A case according to claim 1, wherein the case has a Flex-ATX form factor.

5. A case according to claim 1, wherein the lock requires a key to operate.

6. A case according to claim 1, wherein the lock has a locked position such that when the lock is in the locked position, removal of both the front bezel and the side panel is restricted.

7. A case according to claim 1, wherein the lock requires a tubular key to operate.

8. A mechanism for a case housing an information handling system, the case including a front bezel and a side panel, the mechanism comprising:
- a lock mounted in the front bezel, the lock operable to restrict removal of the front bezel from the case;
- a latch mounted within the case operable to restrict removal of the side panel from the case; and
- a link connecting the lock and the latch, such that operation of the lock to restrict removal of the front bezel from the case also restricts removal of the side panel from the case;
- wherein the lock has a locked position such that when the lock is in the locked position, the lock is configured to disable operation of one or more electronic components of the information handling system.

9. A mechanism according to claim 8, wherein the lock requires a key to operate.

10. A mechanism according to claim 8, wherein the lock requires a tubular key to operate.

11. A mechanism according to claim 8, wherein the lock has a locked position such that when the lock is in the locked position, removal of both the front bezel and the side panel is restricted.

12. An information handling system comprising:
- a case including a front bezel and a side panel;
- a lock mounted in the front bezel, the lock operable to restrict removal of the front bezel from the case;
- a latch mounted within the case operable to restrict removal of the side panel from the case; and
- a link connecting the lock and the latch, such that operation of the lock to restrict removal of the front bezel from the case also restricts removal of the side panel from the case;
- wherein the lock has a locked position such that when the lock is in the locked position, the lock is configured to disable operation of one or more electronic components of the information handling system.

13. An information handling system according to claim 12, wherein the case has an ATX form factor.

14. An information handling system according to claim 12, wherein the case has a micro-ATX form factor.

15. An information handling system according to claim 12, wherein the lock requires a key to operate.

16. An information handling system according to claim 12, wherein the lock requires a tubular key to operate.

17. An information handling system according to claim 12, wherein the lock has a locked position such that when the lock is in the locked position, removal of both the front bezel and the side panel is restricted.

* * * * *